US011132086B1

(12) United States Patent
Love et al.

(10) Patent No.: US 11,132,086 B1
(45) Date of Patent: Sep. 28, 2021

(54) INFORMATION CARRIER OBJECT AND SYSTEM FOR RETRIEVING INFORMATION

(71) Applicant: INTERNATIONAL BUSINESS MACHINES CORPORATION, Armonk, NY (US)

(72) Inventors: Jake Love, Malvern (GB); Leonardo V. Castorina, Grand-Lancy (CH); Thomas G. O'Leary, St Albans (GB); Weilun Gong, London (GB); Giacomo Giuseppe Chiarella, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/069,888

(22) Filed: Oct. 14, 2020

(51) Int. Cl.
 *G06F 3/041* (2006.01)
 *G06F 3/044* (2006.01)

(52) U.S. Cl.
 CPC .......... *G06F 3/04166* (2019.05); *G06F 3/044* (2013.01); *G06F 3/04186* (2019.05)

(58) Field of Classification Search
 CPC ... G06F 3/04166; G06F 3/04186; G06F 3/044
 See application file for complete search history.

(56) References Cited

U.S. PATENT DOCUMENTS

| | | | | |
|---|---|---|---|---|
| 9,111,406 | B2 * | 8/2015 | Aubert | G07F 7/0833 |
| 9,927,932 | B2 * | 3/2018 | Aubert | G07F 7/0813 |
| 2011/0095992 | A1 * | 4/2011 | Yeh | G06F 3/03543 |
| | | | | 345/173 |
| 2012/0007808 | A1 * | 1/2012 | Heatherly | A63F 13/40 |
| | | | | 345/173 |
| 2012/0019480 | A1 | 1/2012 | Cannon | |
| 2013/0044078 | A1 * | 2/2013 | Hallenberg | G06F 3/0393 |
| | | | | 345/174 |
| 2013/0135246 | A1 * | 5/2013 | Aubert | G06Q 20/40 |
| | | | | 345/174 |
| 2015/0253905 | A1 * | 9/2015 | Aubert | G06Q 20/40 |
| | | | | 705/44 |
| 2016/0067596 | A1 | 3/2016 | Gentile | |
| 2017/0280290 | A1 | 9/2017 | Jones | |
| 2018/0074621 | A1 * | 3/2018 | Aubert | G06F 3/044 |
| 2019/0102035 | A1 | 4/2019 | Foerster | |
| 2020/0311359 | A1 * | 10/2020 | Sajjaanantakul | G07D 7/026 |

OTHER PUBLICATIONS

Anonymous, "Circular Barcode," TechnoRiver, [accessed on Mar. 24, 2020], 2 pages, Retrieved from the Internet: <URL: https://www.technoriversoft.com/CircularBarcode.html>.

* cited by examiner

*Primary Examiner* — Michael Pervan
(74) *Attorney, Agent, or Firm* — Samuel A. Waldbaum

(57) ABSTRACT

An information carrier object is provided for providing information via a touch-sensitive interface of a computing device. The information carrier object includes a substrate supporting a planar region on which a plurality of touchpoints is defined. A first subset of the touchpoints are data-encoding touchpoints arranged in a circular geometric configuration in which a position of each touchpoint conveys encoded data and a second subset of the touchpoints are reference touchpoints in relation to which data-encoding touchpoints are positioned. A method and system are provided for retrieving information from an information carrier object applied to a touch-sensitive interface.

20 Claims, 5 Drawing Sheets

US 11,132,086 B1

INFORMATION CARRIER OBJECT AND SYSTEM FOR RETRIEVING INFORMATION

BACKGROUND

The present invention relates to an information carrier object and a system for retrieving information, and more specifically, to retrieving information via a touch-sensitive input device.

When visiting an event or consumer outlet, users are often given business cards or pamphlets with Quick Response (QR) codes or Uniform Resource Locators (URLs) that point to a website that the user may visit later. QR codes have become a common form of consumer advertising and are typically very easy to use with a smartphone. QR codes and URLs may appear in magazines, on signs, on business cards, etc. Users with a smartphone equipped with a reader application may scan the image of the QR code using the camera functionality of their smartphone to display text, contact information, connect to a wireless network, or open a web page in the smartphone browser.

Some users prefer to operate from a computing device into which the scanning of a QR code is not as user friendly. Many users operate on laptop computers into which scanning a QR code is not intuitive. An alternative for these users is to manually enter a URL using a keyboard; however, this is time consuming and prone to input error.

BRIEF SUMMARY

Additional aspects and/or advantages will be set forth in part in the description which follows and, in part, will be apparent from the description, or may be learned by practice of the invention.

According to an aspect of the present invention there is provided an information carrier object for providing information via a touch-sensitive interface of a computing device, comprising: a substrate supporting a planar region on which a plurality of touchpoints is defined; wherein a first subset of the touchpoints are data-encoding touchpoints arranged in a circular geometric configuration in which a position of each touchpoint conveys encoded data; and wherein a second subset of the touchpoints are reference touchpoints in relation to which data-encoding touchpoints are positioned.

According to another aspect of the present invention there is provided a computer-implemented method for retrieving information from an information carrier object applied to a touch-sensitive interface, comprising: recognizing a received input via a touch-sensitive interface of multiple simultaneous touchpoints in a rotating movement; reading a circular geometric configuration of the multiple touchpoints including identifying at least two reference touchpoints and determining a position of each non-reference touchpoint in relation to the reference touchpoints; and interpreting the relative position of each non-reference touchpoint to decode data conveyed by each non-reference touchpoint.

According to another aspect of the present invention there is provided a system for retrieving information from an information carrier object applied to a touch-sensitive interface, comprising: a processor and a memory configured to provide computer program instructions to the processor to execute the function of the components: an input recognizing component for recognizing a received input via a touch-sensitive interface of multiple simultaneous touchpoints in a rotating movement; a reading component for reading a circular geometric configuration of the multiple touchpoints including identifying at least two reference touchpoints and determining a position of each non-reference touchpoint in relation to the reference touchpoints; and an interpreting component for interpreting the relative position of each non-reference touchpoint to decode data conveyed by each non-reference touchpoint.

According to a further aspect of the present invention there is provided a computer program product for retrieving information from an information carrier object applied to a touch-sensitive interface, the computer program product comprising a computer readable storage medium having program instructions embodied therewith, the program instructions executable by a processor to cause the processor to: recognize a received input via a touch-sensitive interface of multiple simultaneous touchpoints in a rotating movement; read a circular geometric configuration of the multiple touchpoints including identifying at least two reference touchpoints and determining a position of each non-reference touchpoint in relation to the reference touchpoints; and interpret the relative position of each non-reference touchpoint to decode data conveyed by each non-reference touchpoint.

The computer readable storage medium may be a non-transitory computer readable storage medium and the computer readable program code may be executable by a processing circuit.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
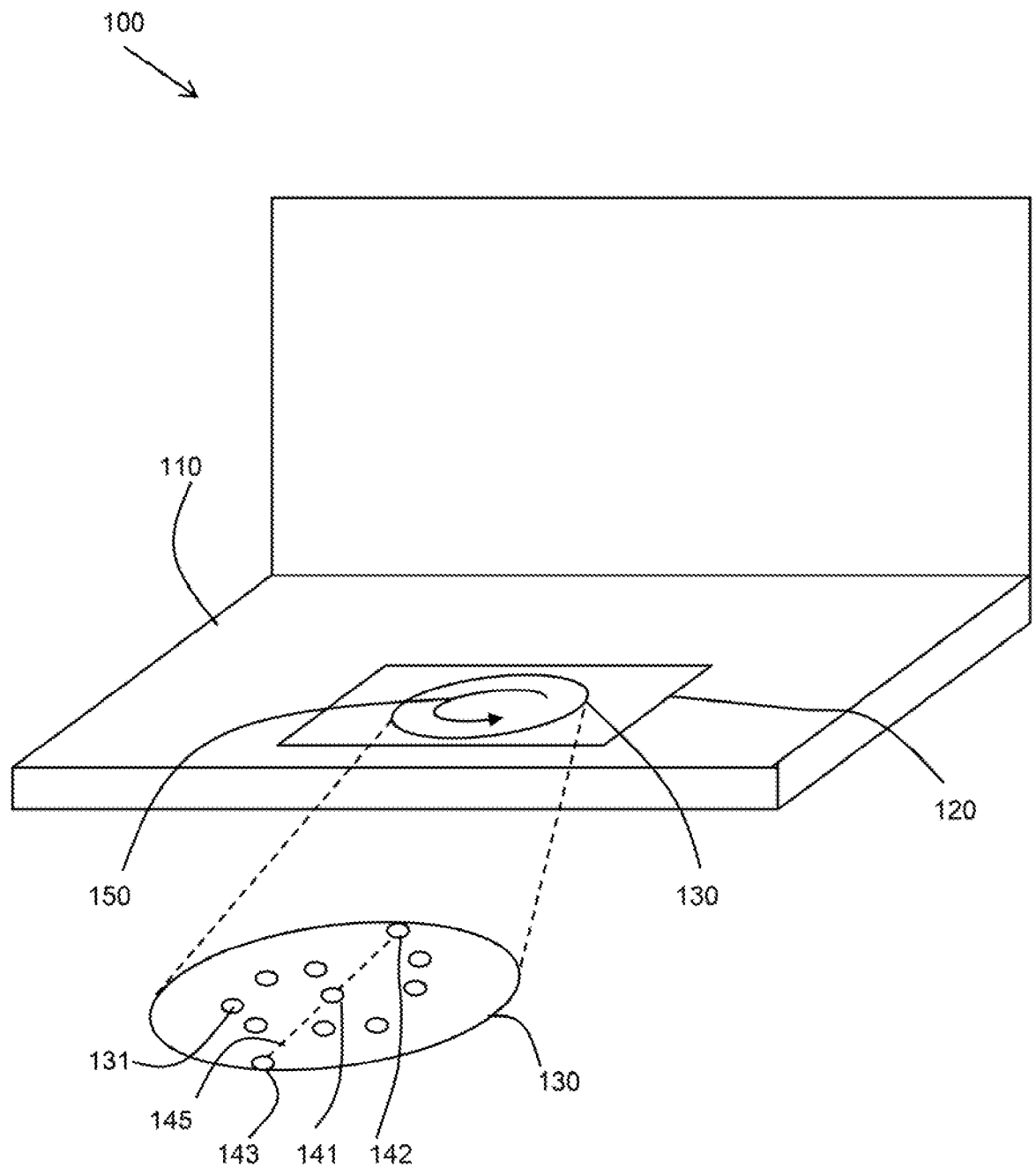
FIG. 1 is a schematic diagram illustrating a system in accordance with the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

An information carrier object is described in which information is encoded in a circular geometric pattern of touchpoints of the object that interact with a touch-sensitive interface of a computing device to transfer information. A rotational motion of the object on the touch-sensitive interface activates the reading of the touchpoint configuration to extract the information.

The information carrier object may have a substrate on which the touchpoints are provided in the form of conductive points or protrusions from the substrate that each register as an input point on a touch-sensitive interface, such as a touch pad or resistive technology input screen.

In one embodiment, the touchpoints are provided in a circular geometric pattern and the arrangement of the touchpoints' radial distance measurement and radial angle measurement may encode the data. The measurements may be in relation to the arrangement of the other touchpoints with at least two reference touchpoints provided across a diameter of the circular pattern to center the touchpoints.

Several touchpoints are needed to encode the information. In one embodiment, the information is an Internet Protocol (IP) address and the touchpoints each geometrically encode sufficient data to translate into an IP address. In the described embodiment, the geometric arrangement of each touchpoint provides four bits of data; however, this may be increased with more complex geometric interpretation of the touchpoints' arrangements. Some touch-sensitive interfaces are restricted to a number of points that can receive information simultaneously, for example, 11 points on a touchpad or 20 points on other forms of interface, and this limitation may dictate the complexity required of the data-encoding in the geometric pattern.

Referring to FIG. 1, a schematic diagram 100 shows an example embodiment of a computing device in the form of a laptop 110 having a touch-sensitive interface 120 in the form of a trackpad. An information carrier object 130 is provided that is configured to interact with the touch-sensitive interface 120. The information carrier object 130 is shown placed on the touchpad 130 and removed from the touchpad 130 in order to illustrate the underside of the object 130.

The object 130 has multiple touchpoints 131 that are provided on its underside (as shown in FIG. 1). The circular geometric configuration of the touchpoints 131 encodes information. Additional reference touchpoints 141 may be provided on a diameter 142 of the circular configuration to reference the other touchpoints 131 whose pattern is interpreted as information.

There may be two or more reference touchpoints 141, 142, 143 and multiple data-encoding touchpoints 131. There may be in the range of 8 to 20 data-encoding touchpoints 131 so that sufficient data can be encoded to provide a piece of information whilst keeping the number of total touchpoints below the maximum number of points that can be concurrently interpreted on an interface. The number of data-encoding touchpoints 131 stated here are not to be seen as limiting, such that the number of data-encoding touchpoints 131 can be less than 8 or greater than 20. If an interface can identify more than 20 concurrent inputs, then the number of touchpoints may be greater than 20.

The object 130 is configured to be placed against the touch-sensitive interface 120 when the information is to be transferred to the computing device. The object 130 is placed on the touch-sensitive interface 120 with a spinning or rotating action 150. This may be in a configured direction, clockwise or anti-clockwise. The spinning or rotating action 150 has the effect of triggering the decoding or interpreting of the geometric pattern of the touchpoints 131 that touch the touch-sensitive interface 120.

The object 130 may be circular in shape in correspondence with the circular geometric pattern of the touchpoints 131 or may be of another shape. The object 130 may include a handle or gripping member on its upper side to aid in applying the spinning or rotating action 150.

Figure 2:
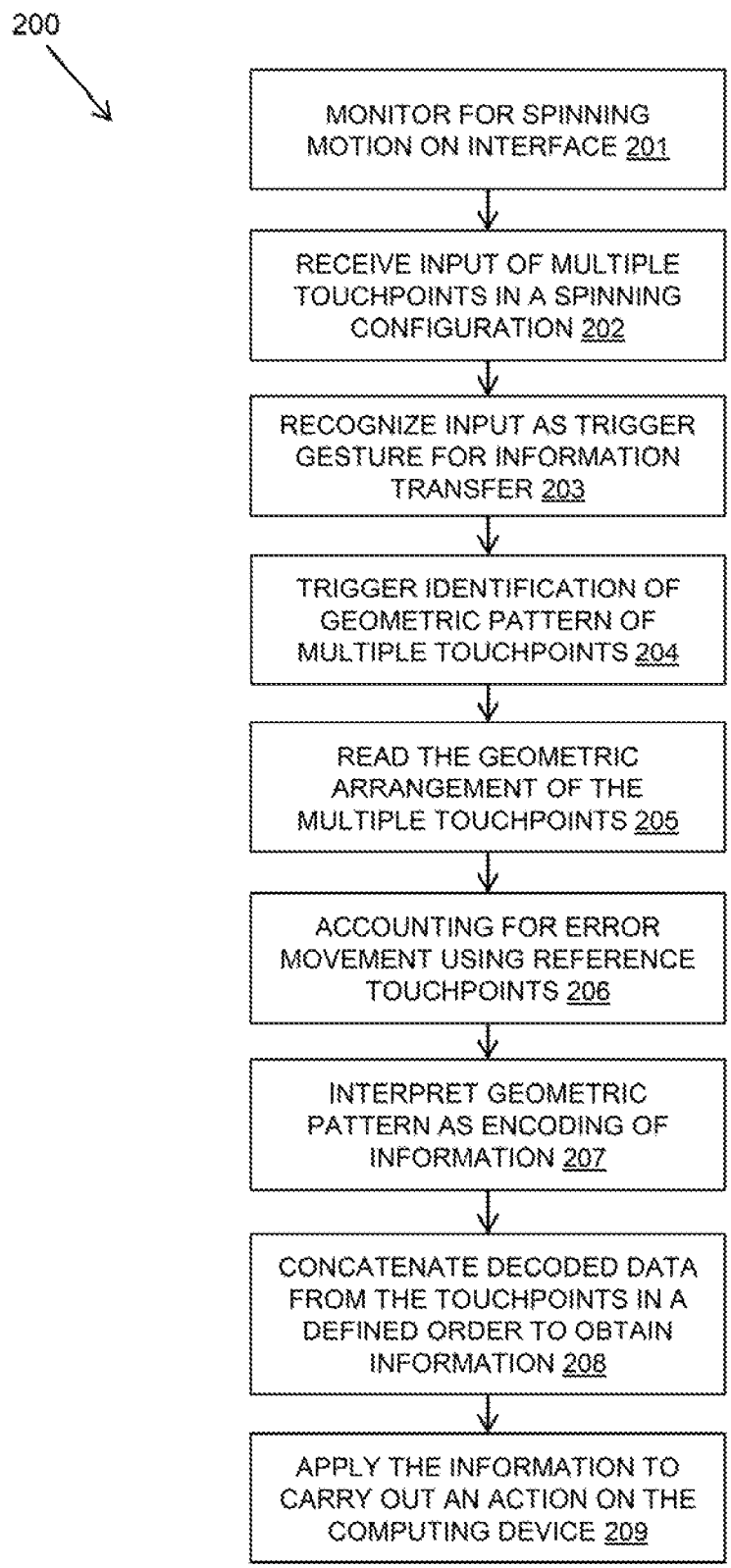
FIG. 2 is a flow diagram of an example embodiment of a method in accordance with the present invention.

Referring to FIG. 2, a flow diagram 200 shows an example embodiment of a method carried out at a computing device at which the information carrying object 130 is applied to a touch-sensitive interface 120. The method may be carried out by an operating system of the computing device or by an application that is able to have interaction with the inputs of the touch-sensitive interface of the computing device.

The method may monitor inputs at the touch-sensitive interface 120 of the computing device for a defined spinning or rotation input of multiple touchpoints on the touch-sensitive interface (201). The defined spinning or rotation input may rotate a configured number of simultaneous touchpoints about at least a configured angle. The method may receive input of multiple touchpoints in a spinning or rotating configuration at the touch-sensitive interface (202) and the input may be recognized as a trigger gesture for information transfer from the touchpoints (203).

The method may trigger an identification process for identification of the geometric pattern of the touchpoints (204). In one embodiment, the operating system of the computing device may recognize the spinning motion as a unique gesture indicating that information is about to be received and may open an information interpreting application.

The method may read the geometric arrangement of the multiple touchpoints by recording the location and trajectories of the touchpoints (205). The reading may account for error or inexact movement of the touchpoints as the object is rotated by reading the arrangement in relation to reference touchpoints (206). The reading may be carried out from any angle or placement on the touch-sensitive interface.

The method may interpret the geometric pattern of the touchpoints as an encoding of information (207). An example embodiment of geometric pattern encoding is given in relation to FIGS. 3A and 3B. Interpreting the relative position of each non-reference touchpoint may include, for example, interpreting two bits of data based on a distance of a touchpoint from a center of the circular geometric configuration and two bits of data based on an angular distance of the touchpoint relative to a next touchpoint or a reference touchpoint. Other method of interpreting the geometric pattern may result in more or less bits of data per touchpoint. For example, 6 bits of data may be encoded by interpreting a third measurement.

The method may include concatenating the decoded data of each non-reference touchpoint in a predefined order to obtain a piece of information (208).

The method may apply the piece of information to carry out an action on the computing device (209). For example, the information may be an IP address that the method may cause the default browser to open and to navigate the user to the website which is then domain name server resolved. In another embodiment, the information may map to another form of action.

Figure 3A:
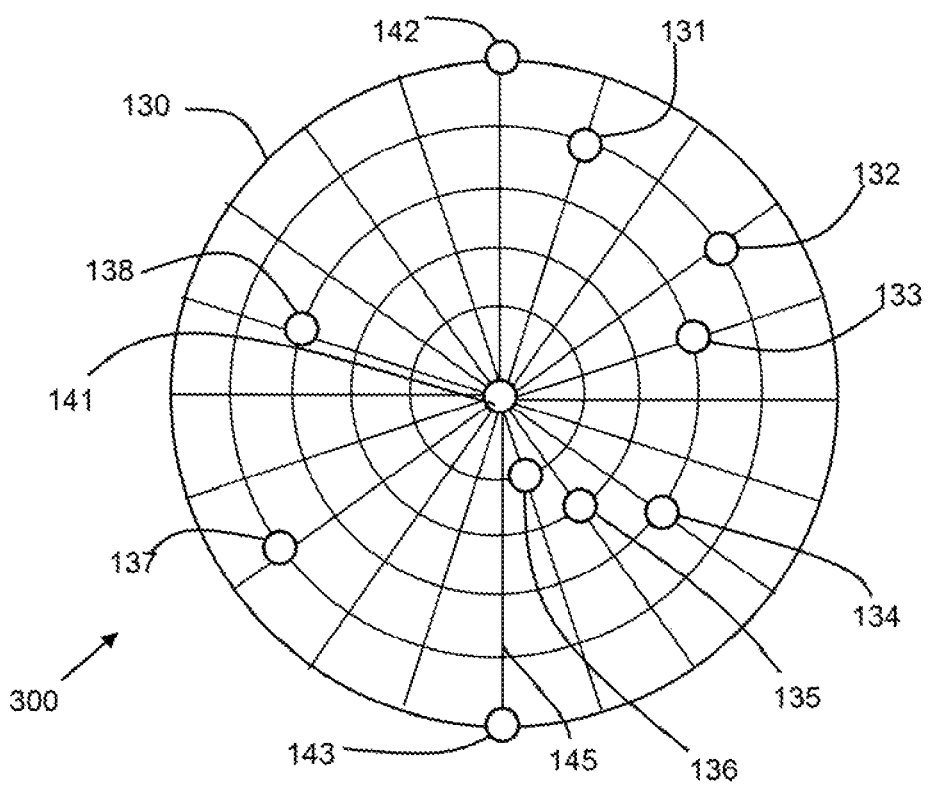
FIGS. 3A and 3B are schematic diagrams illustrating an example embodiment of a geometric arrangement of conductive points in accordance with the present invention.
Figure 3B:
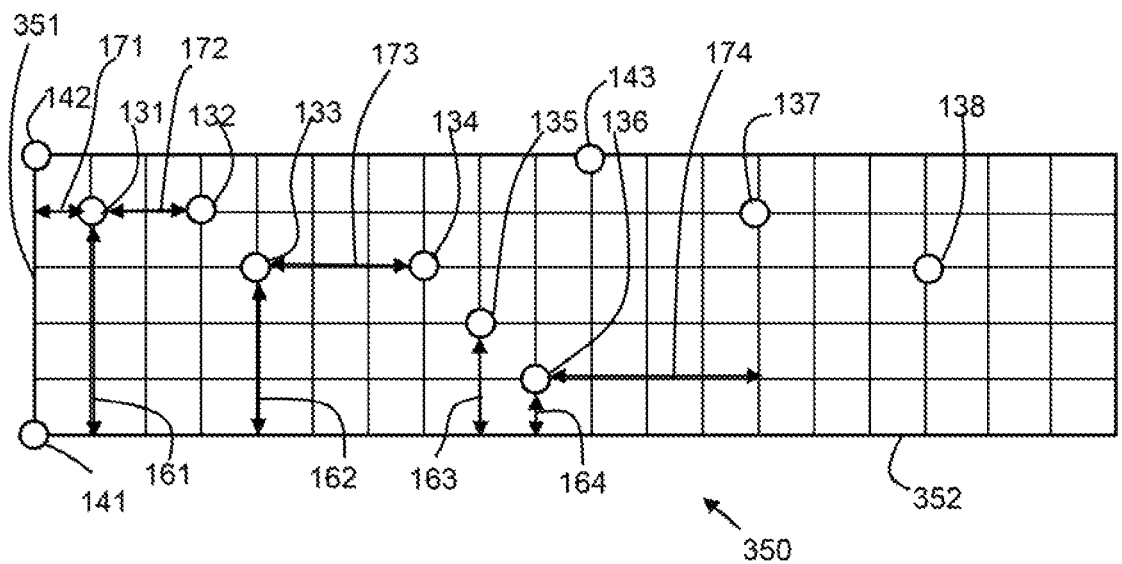

Referring to FIG. 3A, an example embodiment of a circular geometric arrangement 300 of touchpoints on an information carrier object 130 is shown with a geometric encoding of data in the touchpoint positions. FIG. 3B shows the same geometric arrangement as a rectangular projection 350 in order to illustrate the arrangement measurements clearly.

For example, touchpads can track up to 11 distinctive points, therefore this example embodiment uses this number of touchpoints. The data is illustrated as encoded onto a rectangular plane as shown in FIG. 3B. The x-axis 352 is periodic as the plane will be projected onto a disc. The y-axis 351 of the plane is defined by two reference points, one at the origin that will be the center reference point 141, and one at the top corner of the y-axis 142. A third reference point 143 may be provided at a mid-point of the outer edge of the rectangular plane that will project as a point on the opposite side of the diameter from the other non-central reference point 142.

In order to distinguish which of the touchpoints other than the central reference point 141 are the reference points 142, 143, two reference points 142, 143 are provided on the outer circumference of the disc and in line with the central reference point 141.

After creating the reference points 141, 142, 143, there are 8 data points 131-138 left to encode information. For an IP addresses 32 bits of information need to be encoded, so 4 bits are encoded into each point. These bits are encoded with two components. The first two bits are encoded in the vertical distance of the points along the y-axis, which will project as the radial distance in the circular arrangement. The second two bits are encoded in the horizontal distance of the points along the x-axis, which will project as relative distances along concentric circles in the circular arrangement that correspond to angular distances.

For the first data component, to store 2 bits there are 2^2=4 discrete distances 161-164 along the y axis. All of the distances are smaller than the distance from the origin reference point 141 to the y-axis reference point 142, so that the interpretation knows which point is the reference point. In this example, the first, greatest distance 161 (within the reference points 141, 142) corresponds to bit sequence 11, the second distance 162 corresponds to 10, the third distance 163 corresponds to 01, and the fourth distance corresponds to 00. The exact distances may be predefined to be set fractions of the y-axis height. Note that points must be non-zero distance from away from the x-axis otherwise they will be mapped to the origin when the plane is projected onto a disc.

For the second data component, the next 2 bits are stored in the distance from the current point to the next point. Again, in this example, there are 4 possible values for this. These distances are referred to as A 171, B 172, C 173 and D 174. The lengths B, C, and D are defined such that B=2A, C=3A and D=4A. Length A 171 is defined as the distance along the x-axis between the diameter of the reference points 141, 142, 143 and first data point 131. A 171 corresponds to the bit sequence 00, B 172 corresponds to 01, C 173 corresponds to 10, and D 174 corresponds to 11.

The distance A 171 as the between the diameter of the reference points 141, 142, 143 and the first data point 131 along the x-axis is noted. To obtain the first 4 bits of data, the position of the first data point 131 is considered. The first 2 bits come from its vertical distance. The first data point is at the greatest distance 161 in the y-direction which corresponds to bits "11". The x-direction distance to the next bit is 2A, which is B, which corresponds to the bit sequence "01". Therefore, the total information given by the first point is "1101". This is repeated for all the data points 131-138. As shown in FIG. 3B.

Concatenating all these values gives "11011000101010000100001111101000". This translates to the IP address: 220.168.67.232.

To implement this on a circular arrangement, the rectangle of FIG. 3B is projected onto a disc that can then be spun on a trackpad as shown in FIG. 3A.

When the created pattern is spun on a trackpad, it will generate a unique gesture, especially if taking focus on the reference points 141, 142, 143. This will trigger a component on the computing device to decode all the touchpoints 131-138. Spinning in this embodiment is the trigger that tells the computing device that what is being input is a code, as opposed to another regular input gesture that a user might perform.

Since two reference points 142, 143 are on the outer circumference of the circle and are at an angle of pi from each other, they cannot be further apart. To distinguish the reference points 142, 143, the interpreter looks for the pair of points which are furthest apart. The origin reference point 141 may be redundant and may optionally be removed. However, this may provide a useful centering point for error correction.

In cases where the user does not rotate the disc perfectly there may be errors when trying to decode the data. To compensate for this, the state of the origin reference point 141 (the midpoint of the two other reference points) may be subtracted from all the other conductive points in order to remove imperfections from the user's motion of the physical object.

An information carrier object of this type has compatibility with computing devices that do not include a camera or scanning functionality, such as devices with touchpads or devices that have resistive technologies. As there is no need for a computing device to have a camera in order to receive the information, this improves privacy. The input may be faster, as it does not require perfect alignment of a code nor does it need to wait for image recognition.

A QR code requires either a camera to be constantly turned on or an application to be opened in order to read the QR code. The former is a battery drain and also a privacy concern. The latter is an extra step that often discourages users from using QR codes. The described information carrier object uses touch capabilities that are always turned on. How the user interacts with the described information carrier object makes it a much more approachable user experience.

The described information carrier object provides security in certain contexts as the arrangement of the touchpoints may be hidden from view, for example, between sheets of a substrate preventing copying. By comparison, QR codes have to be captured and therefore cannot be hidden.

The described information carrier object may be used in place of radio-frequency identification (RFID) tags without the need for new hardware on current or old computing device s. It is also more practical than embedding RFID readers into computing devices.

Example Use Case 1

The described information carrier object may be effective in use cases where the information is to be returned or be readily available for a specific period of time. One such use case may be WiFi passwords at hotels and other similar venues. The touchpoint configuration pattern may be added to hotel-room cards. The user may then use this hotel room card as the information carrier object to authenticate into all of their devices (computer, phone, tablet, etc.). In this way, the use can easily carry a password with them that is compatible with every touch screen device and seamlessly use it. This pattern is hard to copy, unlike a QR code and once the key card is returned, the user will lose access to the password.

The same scenario may be implemented at a home, where the homeowner has the touchpoint pattern embedded into a router or card to share the password with people at their home, without them having to take a picture of it or read out a password.

Example Use Case 2

The information carrier object may be used on video game consoles that have a touchscreen or touchpad but do not have a camera.

The information carrier object may be used as an alternative to the near-field communication (NFC) toys used by some games. Instead of requiring an NFC reader attachment in many cases, the information carrier object may work directly with the existing touchscreens. This also adds an extra layer of interaction between the user and the video game on the screen.

In this scenario, the information carrier objects may carry information of a character or action. When the user inputs this motion on the touch screen the video game would react as per the current interactions.

Figure 4:
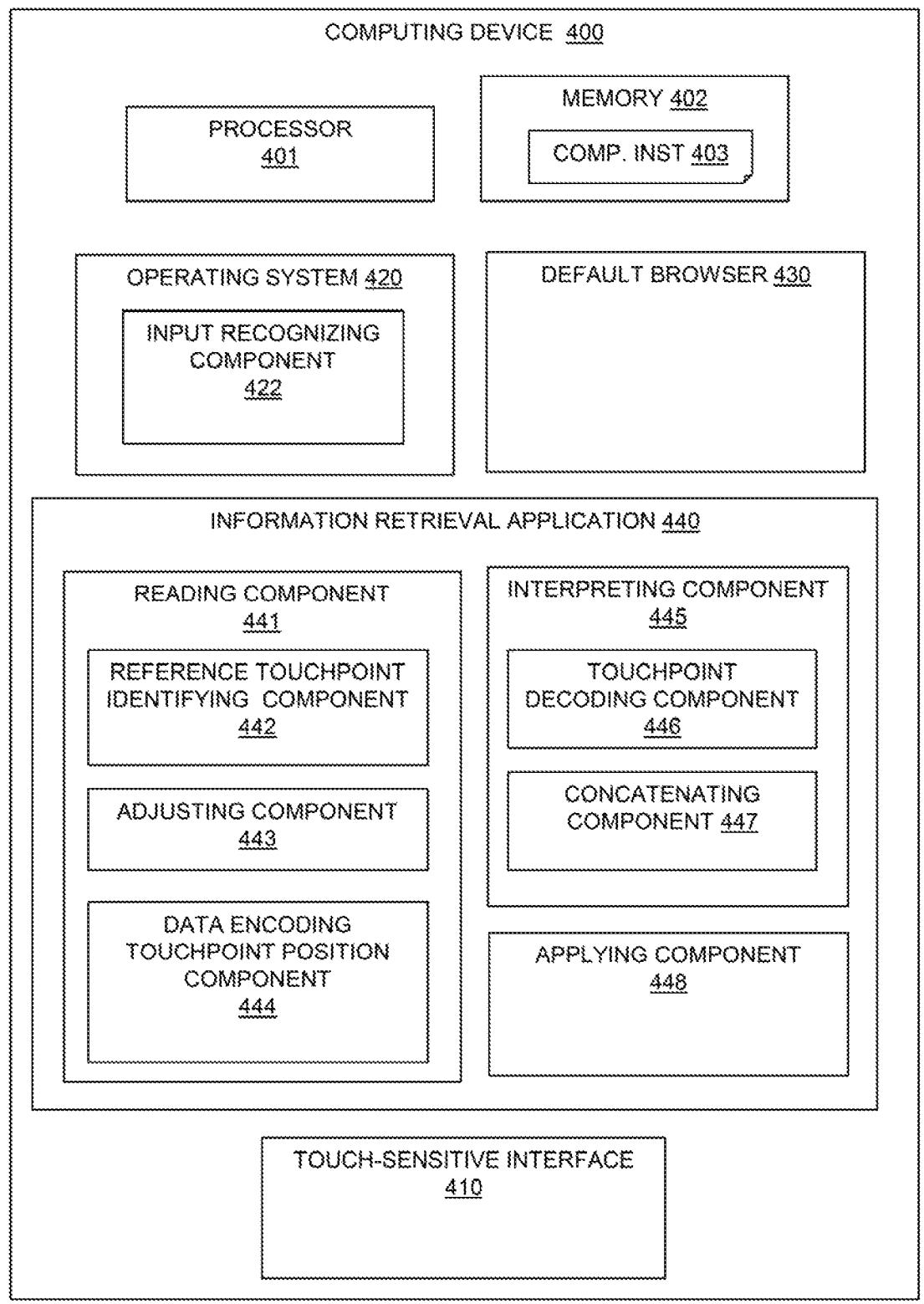
FIG. 4 is block diagram of an example embodiment of a system in accordance with the present invention.

Referring to FIG. 4, a block diagram shows an example embodiment of a computing device 400 including functionality for retrieving information from an information carrier object applied to a touch-sensitive interface 410 of the computing device 400.

The computing device 400 includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The computing device 400 may include an operating system 420 including an input recognizing component 422 for recognizing a received input via the touch-sensitive interface 410 of multiple simultaneous touchpoints in a rotating movement. The recognizing component 422 may trigger an information retrieval application 440 including a reading component 441 and an interpreting component 445.

The reading component 441 may include functionality to read a circular geometric configuration of multiple touchpoints received at the touch-sensitive interface 410 including a reference touchpoint identifying component 442 for identifying at least two reference touchpoints. The reading component 441 may include an adjusting component 443 for accounting for error movement of the non-reference touchpoints by reading the configuration of the touchpoints in relation to the reference touchpoints. The reading component 441 also includes a data-encoding touchpoint position component 444 for determining a position of each non-reference touchpoint in relation to the reference touchpoints.

The interpreting component 445 may include a touchpoint decoding component 446 for interpreting the relative position of each non-reference touchpoint to decode data conveyed by each non-reference touchpoint and a concatenating component 447 for concatenating the decoded data of each non-reference touchpoint in a predefined order to obtain a piece of information.

The information retrieval application 440 may include an applying component 448 for applying the concatenated decoded data to carry out an action. For example, the action may open a default browser 430 of the computing device and the concatenated decoded data may be an IP address that may be resolved in the default browser 430 to display information.

Figure 5:
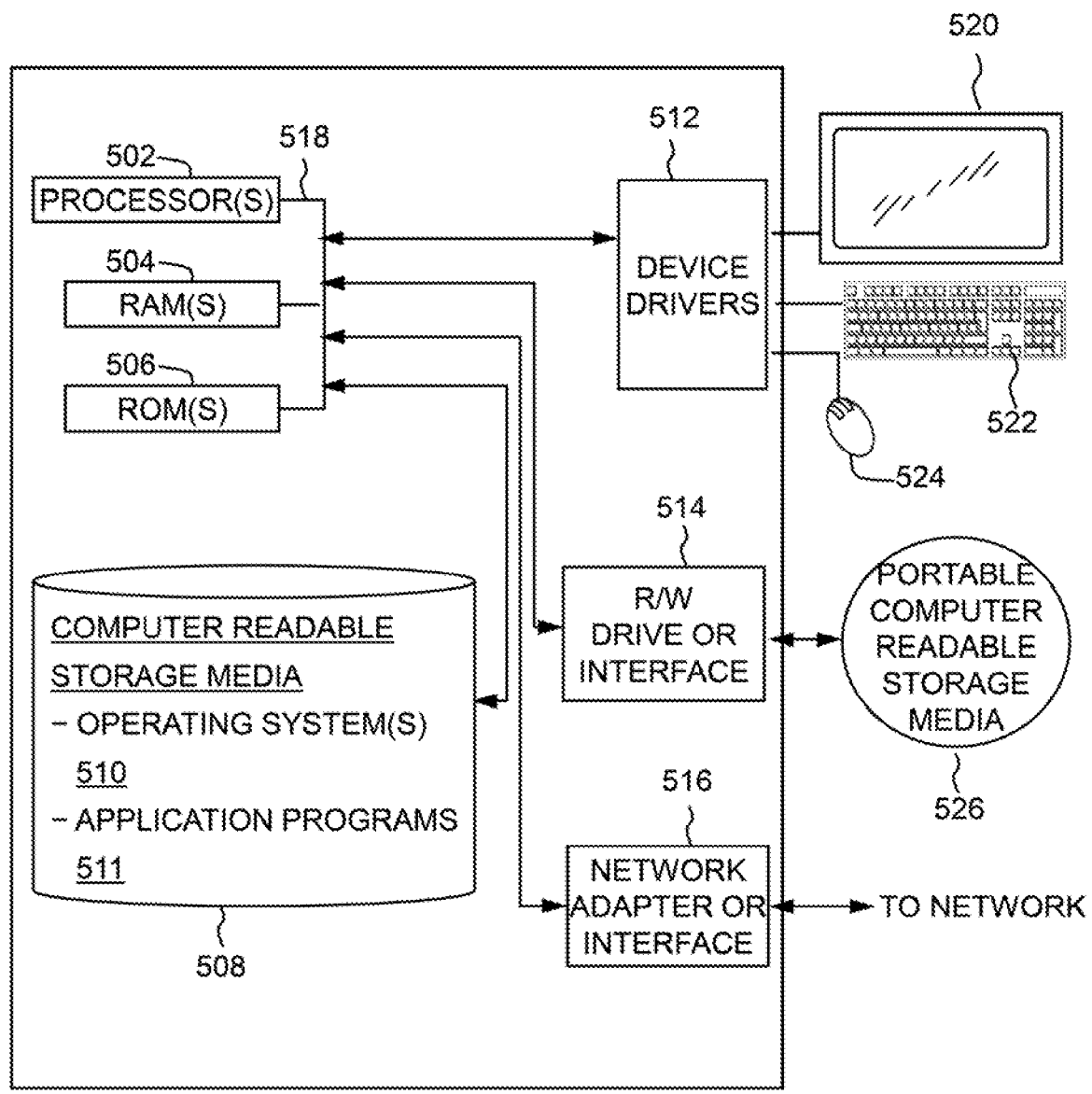
FIG. 5 is a block diagram of an embodiment of a computer system in which the present invention may be implemented.

FIG. 5 depicts a block diagram of components of the computing device 400 of FIG. 4, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 400 can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510 and application programs 511 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 400 can also include a R/W drive or interface 514 to read from and write to one or more portable computer readable storage media 526. Application programs 511 on computing device 400 can be stored on one or more of the portable computer readable storage media 526, read via the respective R/W drive or interface 514 and loaded into the respective computer readable storage media 508.

Computing device 400 can also include a network adapter or interface 516, such as a TCP/IP adapter card or wireless communication adapter. Application programs 511 on computing device 400 can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing device 400 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. An information carrier object for providing information via a touch-sensitive interface of a computing device, comprising:
    a substrate supporting a planar region on which a plurality of touchpoints is defined;
    wherein a first subset of the touchpoints are data-encoding touchpoints arranged in a circular geometric configuration in which a position of each touchpoint conveys encoded data; and
    wherein a second subset of the touchpoints are reference touchpoints in relation to which data-encoding touchpoints are positioned.

2. The information carrier object as claimed in claim 1, wherein the data-encoding touchpoints encode two bits of data based on a distance of a touchpoint from a center of the circular geometric configuration and two bits of data based on an angular distance of the touchpoint relative to a next touchpoint or a reference touchpoint.

3. The information carrier object as claimed in claim 2, wherein the two bits of data based on a distance of a touchpoint from the center are based on predefined bits for each distinct distance.

4. The information carrier object as claimed in claim 2, wherein the two bits of data based on an angular distance are based on predefined bits for a multiple of a distance from a first touchpoint to a reference touchpoint applied to the angular distance between a touchpoint and a next touchpoint.

5. The information carrier object as claimed in claim 1, wherein there are eight data-encoding touchpoints each encoding four bits of data providing a 32 bit piece of information.

6. The information carrier object as claimed in claim 1, wherein the piece of information is an Internet Protocol address.

7. The information carrier object as claimed in claim 1, wherein there are at least two reference touchpoints that are arranged to define a diameter of the circular geometric configuration.

8. The information carrier object as claimed in claim 1, wherein the touchpoints are conductive points that interact with a touch-sensitive interface.

9. The information carrier object as claimed in claim 1, wherein the object is in the form of a flat disc supporting the plurality of touchpoints on one surface.

10. A computer-implemented method for retrieving information from an information carrier object applied to a touch-sensitive interface, comprising:
    recognizing a received input via a touch-sensitive interface of multiple simultaneous touchpoints in a rotating movement;
    reading a circular geometric configuration of the multiple touchpoints including identifying at least two reference touchpoints and determining a position of each non-reference touchpoint in relation to the reference touchpoints; and
    interpreting the relative position of each non-reference touchpoint to decode data conveyed by each non-reference touchpoint.

11. The method as claimed in claim 10, wherein reading the circular geometric configuration accounts for error movement of the non-reference touchpoints as the object is rotated by reading the configuration in relation to the reference touchpoints.

12. The method as claimed in claim 10, wherein interpreting the relative position of each non-reference touchpoint includes interpreting two bits of data based on a distance of a touchpoint from a center of the circular geometric configuration and two bits of data based on an angular distance of the touchpoint relative to a next touchpoint or a reference touchpoint.

13. The method as claimed in claim 10, wherein interpreting the non-reference touchpoints includes concatenating the decoded data of each non-reference touchpoint in a predefined order to obtain a piece of information.

14. The method as claimed in claim 13, including applying the obtained piece of information to carry out an action.

15. A system for retrieving information from an information carrier object applied to a touch-sensitive interface, comprising:
    a processor and a memory configured to provide computer program instructions to the processor to execute the function of the components:
        an input recognizing component for recognizing a received input via a touch-sensitive interface of multiple simultaneous touchpoints in a rotating movement;
        a reading component for reading a circular geometric configuration of the multiple touchpoints including identifying at least two reference touchpoints and determining a position of each non-reference touchpoint in relation to the reference touchpoints; and an interpreting component for interpreting the relative position of each non-reference touchpoint to decode data conveyed by each non-reference touchpoint.

16. The system as claimed in claim 15, wherein the reading component includes an adjusting component for accounting for error movement of the non-reference touchpoints as the object is rotated by reading the configuration in relation to the reference touchpoints.

17. The system as claimed in claim 15, wherein the interpreting component for interpreting the relative position of each non-reference touchpoint includes a concatenating component for concatenating the decoded data of each non-reference touchpoint in a predefined order to obtain a piece of information.

18. The system as claimed in claim 15, wherein an operating system includes the recognizing component and triggers an information retrieval application including the reading component and interpreting component.

19. The system as claimed in claim 18, wherein the information retrieval application includes an applying component for applying concatenated decoded data of each non-reference point to carry out an action.

20. The system as claimed in claim 15, wherein the received input is made by an information carrier object for providing information via a touch-sensitive interface of a computing device, comprising:

a substrate supporting a planar region on which a plurality of touchpoints is defined;

wherein a first subset of the touchpoints are data-encoding touchpoints arranged in a circular geometric configuration in which a position of each touchpoint conveys encoded data; and wherein a second subset of the touchpoints are reference touchpoints in relation to which data-encoding touchpoints are positioned.

* * * * *